(12) United States Patent
Chung et al.

(10) Patent No.: US 8,972,965 B2
(45) Date of Patent: Mar. 3, 2015

(54) DISPLAY DEVICE AND METHOD FOR CONTROLLING AND UPGRADING THE SAME

(71) Applicants: Wooseong Chung, Pyeongtaek-si (KR); Jaehan Park, Pyeongtaek-si (KR); Chongsok Kim, Pyeongtaek-si (KR)

(72) Inventors: Wooseong Chung, Pyeongtaek-si (KR); Jaehan Park, Pyeongtaek-si (KR); Chongsok Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 145 days.

(21) Appl. No.: 13/625,383

(22) Filed: Sep. 24, 2012

(65) Prior Publication Data
US 2013/0258204 A1  Oct. 3, 2013

(30) Foreign Application Priority Data

Apr. 2, 2012 (KR) .................... 10-2012-0034064

(51) Int. Cl.
G06F 9/44 (2006.01)
(52) U.S. Cl.
USPC ............ 717/168; 717/170; 717/173; 348/719
(58) Field of Classification Search
CPC ........................................................ G06F 9/61
USPC ................................................. 717/168–178
See application file for complete search history.

(56) References Cited

U.S. PATENT DOCUMENTS

| | | | | |
|---|---|---|---|---|
| 6,470,496 | B1 * | 10/2002 | Kato et al. ................... | 717/173 |
| 2003/0036870 | A1 | 2/2003 | Kim .............................. | 702/119 |
| 2005/0240919 | A1 * | 10/2005 | Kim et al. .................... | 717/168 |
| 2006/0136899 | A1 * | 6/2006 | Yoo .............................. | 717/168 |
| 2006/0218309 | A1 * | 9/2006 | Young et al. ................. | 710/8 |
| 2007/0261046 | A1 * | 11/2007 | Miller .......................... | 717/168 |
| 2011/0292294 | A1 | 12/2011 | Franke et al. ................ | 348/720 |

FOREIGN PATENT DOCUMENTS

| | | |
|---|---|---|
| EP | 1 852 779 | 11/2007 |
| JP | 11-53289 | 2/1999 |
| TW | 200920134 | 5/2009 |

(Continued)

OTHER PUBLICATIONS

Costa, L.C.P.; Herrero, R.A.; De Biase, M.G.; Nunes, R.P.; Zuffo, M.K., "On air upgrade for digital television set-top boxes," Consumer Electronics (ICCE), 2010 Digest of Technical Papers International Conference, pp. 1-2.*

(Continued)

*Primary Examiner* — Satish Rampuria
(74) *Attorney, Agent, or Firm* — Ked & Associates, LLP

(57) ABSTRACT

A display device and method for controlling and updating the same are disclosed herein. The display device may include a broadcast receiver for receiving a broadcast signal, a demultiplexer for demultiplexing the received broadcast signal, a decoder for decoding the demultiplexed broadcast signal, and a display for displaying the decoded broadcast signal. An external device interface may be provided for receiving upgrade data from an upgrade device. The display device may include a memory for storing the upgrade data and version information of the upgrade device. A controller may be provided to process and display the received broadcast signal on the display, determine whether the upgrade device is connected to the display device, determine whether a version of the upgrade device is an updated version, and assign authority to control the display device to the upgrade device.

14 Claims, 14 Drawing Sheets

(56) References Cited

FOREIGN PATENT DOCUMENTS

WO      WO 99/21309      4/1999
WO      WO 2004/051390      6/2004

OTHER PUBLICATIONS

Costa, L.C.P.; Herrero, R.A.; De Biase, M.G.; Nunes, R.P.; Zuffo, M.K., "Over the air download for digital television receivers upgrade," Consumer Electronics, IEEE Transactions, vol. 56, No. 1, pp. 261-268.*

Mayama, K.; Tanaka, M.; Ando, Y.; Yoshimi, T.; Mizukawa, M., "Design of firmware update system of RT-Middleware for embedded system," SICE Annual Conference 2010, Proceedings of, pp. 2818-2822.*

European Search Report issued in related Application No. 12006285.6 dated Nov. 14, 2013.

European Office Action issued in related Application No. 12 006 285.6 dated Dec. 18, 2014.

* cited by examiner

FIG. 10A
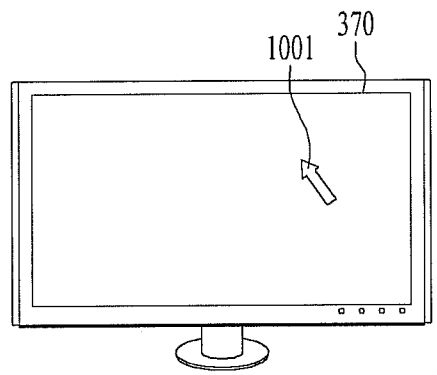
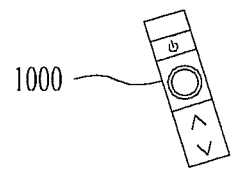
FIG. 10B
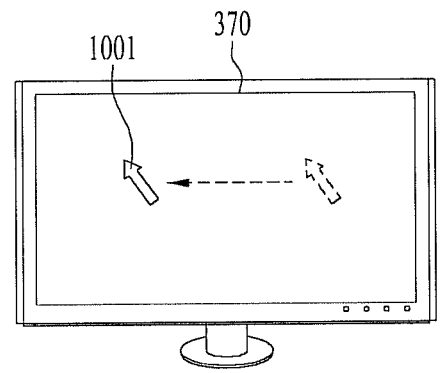
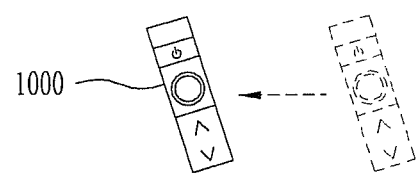

DISPLAY DEVICE AND METHOD FOR CONTROLLING AND UPGRADING THE SAME

CROSS-REFERENCE TO RELATED APPLICATION(S)

This application claims priority under 35 U.S.C. §119 to Korean Application No. 10-2012-0034064 filed in Korea on Apr. 2, 2012, whose entire disclosure is hereby incorporated by reference.

BACKGROUND

1. Field

An display device and method of controlling and upgrading the same are disclosed herein.

2. Background

Display devices and methods for controlling and upgrading the same are known. However, they suffer from various disadvantages.

BRIEF DESCRIPTION OF THE DRAWINGS

The embodiments will be described in detail with reference to the following drawings in which like reference numerals refer to like elements wherein:

FIGS. 10A to 10C are diagrams that illustrate an operation of a remote controller for controlling a display device according to an embodiment of the present disclosure;

DETAILED DESCRIPTION

Figure 1:
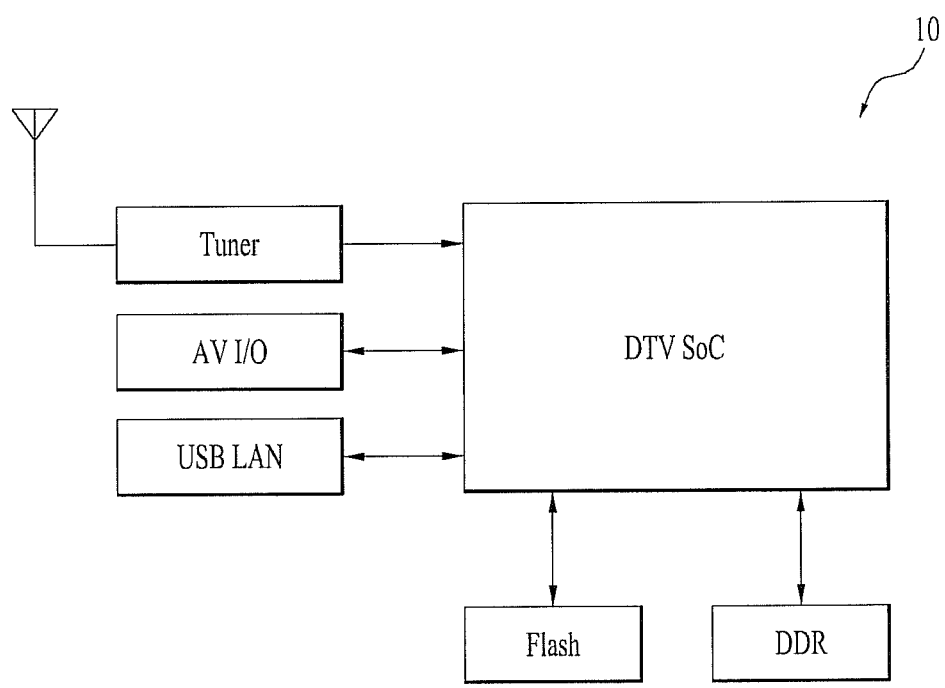
FIG. 1 is a block diagram of a display device according to one embodiment of the present disclosure.

Although embodiments of the present disclosure will be described in detail with reference to the accompanying drawings and content of the drawings, the present disclosure is not limited or restricted by such embodiments.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The terms "module," "unit" or "part" used to signify components are used herein merely to aid in understanding of the components, and thus they should not be considered as having specific meanings or roles. Accordingly, the terms "module," "unit" or "part" may be used interchangeably.

A display device may be a network TV, smart TV, hybrid broadcast broadband television (HBBTV), Internet TV, web TV, Internet protocol television (IPTV), etc. The display device, for example, a digital TV receiver, may process and display not only a broadcast signal received through a satellite or a cable but also video or audio data provided by various external devices such as a video cassette recorder (VCR), a digital versatile disc (DVD) player, a personal computer (PC), a set-top box (STB), etc., which are connected thereto. The external devices (e.g., STB) may be integrated into the display device. Display devices may also access a server through a network and process data or content provided by the server.

Although display related technologies are rapidly being developed, it may be difficult to upgrade the display device with these performance improvements after the purchase of the display device. A conventional display device may be upgraded through after-sale service. However, technical knowledge and additional equipment may be required to perform the upgrade.

A display device and method for controlling the same as broadly disclosed and embodied herein addresses these and other limitations. The display device may be upgraded after purchase. The display device may be easily upgraded using an upgrade device of an updated version, which is connected to the display device. Accordingly, the display device may be easily upgraded without technical knowledge or additional equipment by connecting an upgrade device to the display device.

A display device may be an intelligent network TV having a computer-support function in addition to a broadcast reception function and can include an interface that can be conveniently used, such as a handwriting type input unit, a touchscreen or a spatial remote controller. Furthermore, the display device can be connected to the Internet and a computer since the display device can support a wired or wireless Internet function, and thus a user can be provided with services such as e-mail, web browsing, banking and gaming services through the display device. The display device can use a standardized general-purpose operating system (OS) in order to execute functions relating to the above-mentioned various services. Accordingly, the display device can execute various user-friendly functions by freely adding and deleting various applications on general-purpose OS kernel.

FIG. 1 is a block diagram of a display device according to one embodiment of the present disclosure. The display device 10 may perform a broadcast reception function. However, even prior to being upgraded, the display device 10 can execute a smart function including a computer-support function, which will be described below with reference to FIG. 3.

In embodiments of the present disclosure, the smart function may include all functions that can be performed by a smart TV in addition to the broadcast reception function. For example, the smart function may include a function of using wired/wireless Internet, a function to enable connection to a computer, a function of using various applications installed in the display device, or another appropriate type of function.

Figure 2:
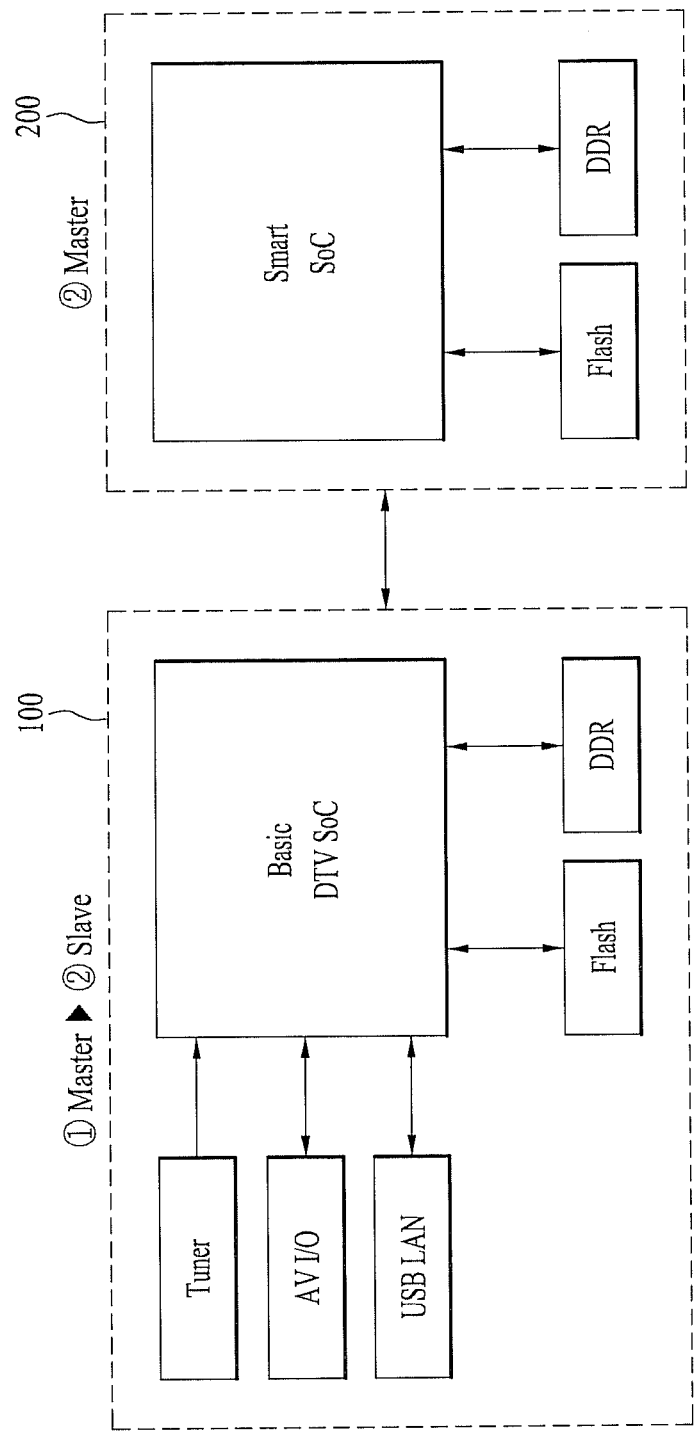
FIG. 2 is a block diagram of a display device equipped with an upgrade device according to one embodiment of the present disclosure.

FIG. 2 is a block diagram of a display device equipped with an upgrade device according to one embodiment of the present disclosure. As shown in FIG. 2, an upgrade device 200 can be connected to an existing display device 100 to upgrade the display device 100. Accordingly, the display device 100 can be updated by upgrading the upgrade device 200.

The existing display device 100 can perform a smart function in addition to a broadcast reception function, and a system-on-chip (SoC) corresponding to a controller of the display device 100 may control the overall operation of the display device 100 as a master with display device control authority until the upgrade device 200 is connected to the display device 100. However, when the upgrade device 200 is connected to the display device, the control authority may be assigned to the upgrade device 200 after upgrade of the display device such that the upgrade device 200 becomes a master and the controller of the display device becomes a slave to provide a path between the upgrade device 200 and the display panel.

Furthermore, the control authority can be assigned to the upgrade device 200 after upgrade of the display device 100 such that a master-slave protocol can operate. Alternatively, the master-slave protocol may operate when a signal representing connection of the upgrade device 200 to the display device 100 is received such that the control authority is switched to the upgrade device 200 to upgrade the display device 100.

The master-slave protocol may define particulars necessary to drive the display device, such as a method of transmitting data between the upgrade device and the controller of the display device, functions executed by the display device and the upgrade device, etc., and may also define a communication method, transmission/reception data definitions, etc., when the upgrade device is set as a master and the controller of the display device is set as a slave.

Figure 3:
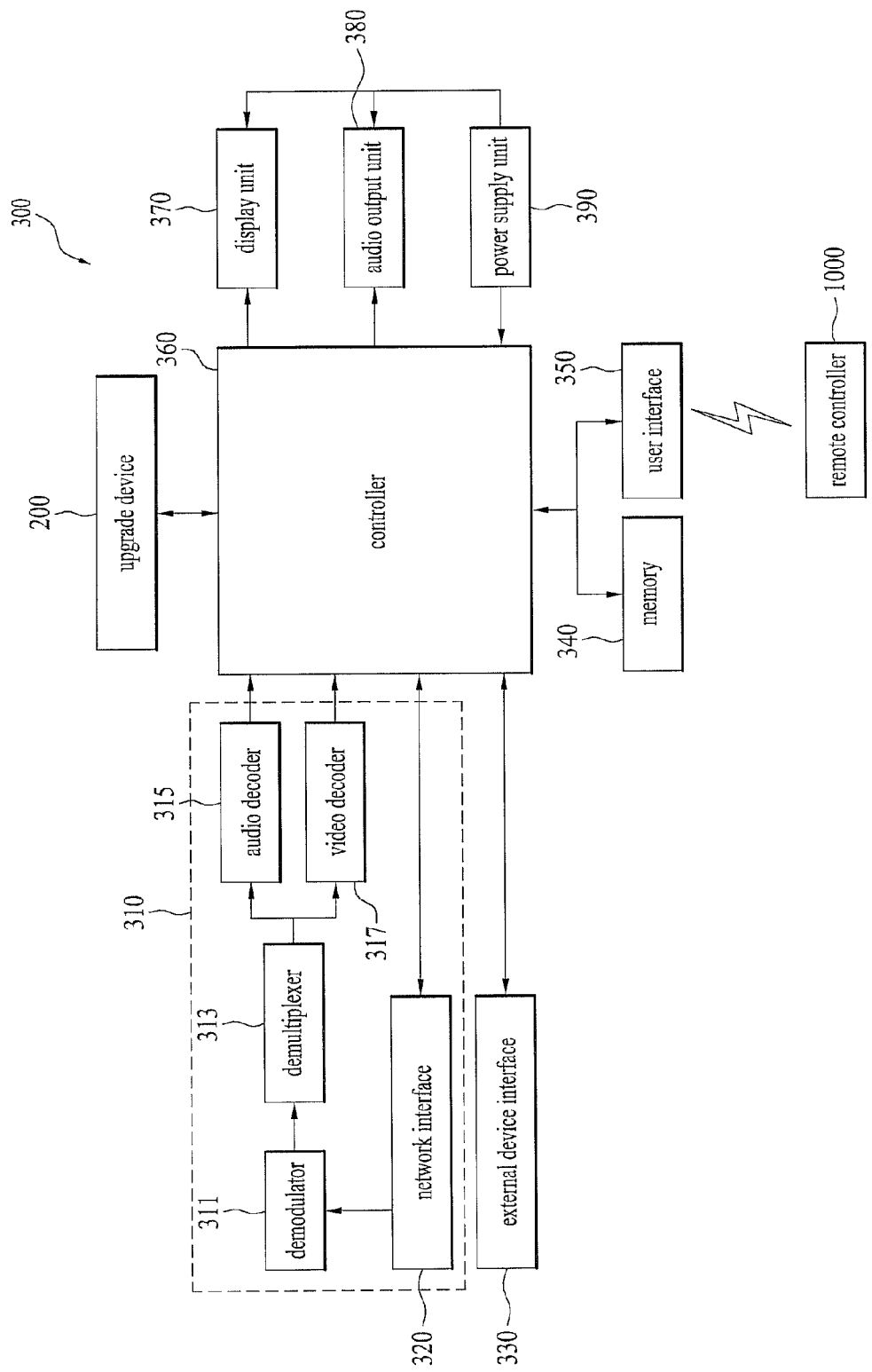
FIG. 3 is a block diagram of a display device according to one embodiment of the present disclosure.

FIG. 3 is a block diagram of a display device according to one embodiment of the present disclosure. It should be appreciated that the configuration of modules as shown in FIG. 3 are illustrative and one or more of the modules may be deleted or a new module may be added as necessary.

A display device 300 may include a broadcast receiver 310, a network interface 320, an external device interface 330, a memory 340, a user interface 350, a controller 360, a display unit 370, an audio output unit 380, and a power supply unit 390. In addition, the display device 300 may include the upgrade device 200 which is physically separate from the display device 300.

The broadcast receiver 310 may include a demodulator 311, a demultiplexer 313, an audio decoder 315, a video decoder 317, and the network interface 320. The broadcast receiver 310 may be designed to include the demodulator 311 and the demultiplexer 313 without the network interface 320 or it may include the network interface 320 without the demodulator 311 and the demultiplexer 313.

The network interface 320 may receive a broadcast signal including audio data and video data and may include a tuner. The tuner can select a radio frequency (RF) broadcast signal(s) corresponding to a channel selected by a user or all previously stored channels from among RF broadcast signals received through an antenna.

The network interface 320 may include an Ethernet terminal, for example, to access a wired network. In addition, the network interface 320 can use communication protocols such as wireless LAN (WLAN) (Wi-Fi), wireless broadband (WiBro), world interoperability for microwave access (WiMax), high speed downlink packet access (HSDPA), etc., for wireless network access. Furthermore, the network interface 320 can select a desired application from within open applications to receive the selected application.

The demodulator 311 may receive a digital IF signal converted by the network interface 320 or the tuner and demodulates the digital IF signal. The demultiplexer 313 may demultiplex audio data and video data included in the demodulated signal. The demultiplexed audio data may be decoded by the audio decoder 315 and the demultiplexed video data may be decoded by the video decoder 317.

The decoded audio data and video data may be input to the controller 360. The controller 360 may perform an additional process on the audio data and video data input thereto, and then output an image corresponding to the video data through the display unit 370 and output sound corresponding to the audio data through the audio output unit 380.

The external device interface 330 may be connected to an external device and a network device. To achieve this, the external device interface 330 may include an A/V input/output unit or a wireless communication unit. The external device interface 330 can be connected to external devices such as a digital versatile disc (DVD) player, a Blu-ray disc (BD) player, a game console, a camera, a camcorder, a computer (notebook computer), etc., in a wired/wireless manner. Furthermore, the external device interface 330 can receive an application or an application list, which may be stored in a remote device, and deliver the application or application list to the controller 360 or the memory 340. Moreover, the external device interface 330 can receive upgrade data from the upgrade device 200 and transmit the upgrade data to the memory 340 or the controller 360.

The upgrade data can include an upgrade program required to improve and correct firmware that is necessary for control and management of hardware after shipment, such as OSD correction, new audio device effect, standby power reduction algorithm, software bug correction, or the like. In addition, the upgrade data can include information about hardware additionally supported by the upgrade device 200 and control data for controlling the hardware. Furthermore, the upgrade data can include additional information containing version information of the upgrade device 200.

The external device interface 330 may include an Ethernet terminal, for example, to access a wired network. In addition, the network interface 320 can use communication protocols such as Wi-Fi, WiBro, WiMax, HSDPA, etc. for wireless network access. Furthermore, the external device interface 330 can select a desired application from within open applications to receive the selected application.

The memory 340 may be configured in the form of an electrically erasable programmable read-only memory (EEPROM) and may store programs for signal processing and control in the controller 360 or processed video, audio and data signals. The memory 340 may perform a function of temporarily storing a video, audio or data signal input from the external device interface 330 or the network interface 320. Furthermore, the memory 340 may store an application or an application list, input from the external device interface 330, the network interface 320 or the like.

In addition, the memory 340 may store the upgrade data received by the external device interface 330 and the version information of the upgrade device 200. If the display device 300 is released without the upgrade device 200, the memory 340 may set an upgrade device version as a default value such that the version information of the upgrade device 200 can be compared with the default value when the upgrade device 200 is connected to the display device 300.

The user interface 350 may transmit a signal input by the user to the controller 350 or deliver a signal from the controller 360 to the user. For example, the user interface 350 can receive input signals such as a power on/off signal, a channel selection signal, a screen setting signal, etc., from a remote controller 500 according to various communication schemes, such as an RF communication scheme or an IR communication scheme, and process the received input signals, or transmit a control signal from the controller 360 to the remote controller 500.

The controller 360 may be configured to automatically recognize whether the upgrade device 200 is connected to the display device according to plug & play or receives a signal representing connection of the upgrade device 200 from the external device interface 330. Upon recognition of connection of the upgrade device 200 to the display device 300, the controller 360 may verify the version of the upgrade device 200, determine that the display device 300 needs to be upgraded if the upgrade device 200 has an updated version, and assign control authority to the upgrade device 200. The controller 360 can assign the control authority to the upgrade device 200 upon reception of upgrade data from the upgrade device 200 and completion of upgrade of the display device using the upgrade data as necessary.

When the controller 360 assigns the control authority to the upgrade device 200, the master-slave protocol operates between the upgrade device 200 and the controller 360, which will be described in detail with reference to FIG. 5.

The display unit 370 may convert a video signal, a data signal or an OSD signal processed by the controller 360, or a video signal or a data signal received from the external device interface 330 into an RGB signal to generate a driving signal. The display unit 370 may be a PDP, an LCD, an OLED, a flexible display, a 3D display, or another appropriate type of display. The display unit 370 can directly receive upgraded content or graphic data from the upgrade device 200 and may display the received content or data.

The audio output unit 380 may receive an audio signal processed by the controller 360, for example, a stereo signal, a 3.1-channel signal, a 5.1-channel signal, or the like, and may output the received signal as sound. The audio output unit 380 can be implemented as one of a variety of speakers.

The power supply unit 390 supplies power to the display device 300. For example, the power supply unit 390 can provide power to the controller 360 that can be configured in the form of an SoC, the display unit 370 for displaying images, and the audio output unit 380 for outputting audio.

The remote controller 1000 may transmit user input to the user interface 350. To achieve this, the remote controller 1000 can use Bluetooth, RF communication, IR communication, Ultra Wideband (UWB), ZigBee, etc. The remote controller 1000 will be described in more detail with reference to FIGS. 10 and 11.

The upgrade device 200 may include hardware or software capable of upgrading the hardware or software of the display device 300. The upgrade device 200 may removably connected to the display device 300. The upgrade device 200 may be implemented in the form of a card or a dongle to be detachably set in the display device 300.

Figure 4:
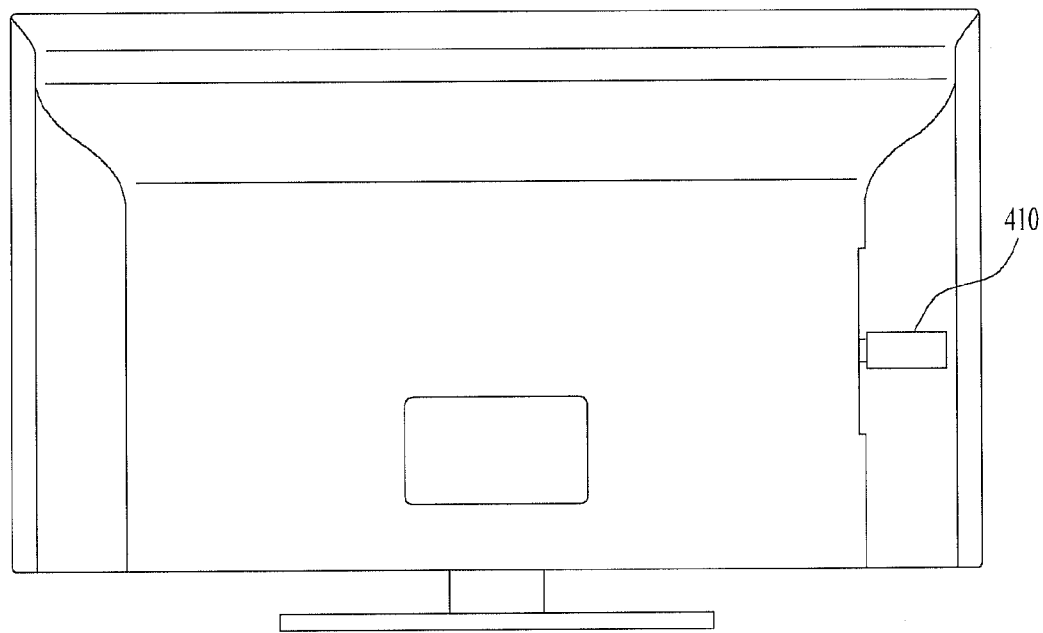
FIG. 4 is a rear view of a display device equipped with an upgrade device according to one embodiment of the present disclosure.

FIG. 4 illustrates connection of the upgrade device to the display device according to one embodiment of the disclosure. The upgrade device is designed in the form of a dongle 410 and connected to the display device. In this case, the user can conveniently connect the upgrade device to the display device because the dongle can be easily connected/separated to/from the display device. The convenience of connection of the upgrade device can be improved as the number of upgrades increases. Furthermore, the upgrade device can be attached to the backside of the display device, as shown in FIG. 4, and thus the appearance of the display device is not spoiled.

The upgrade device 200 can include at least one of content for implementing smart functions in the display device, control data for controlling the smart functions or graphics data, and can be implemented in the form of an SoC.

Figure 5:
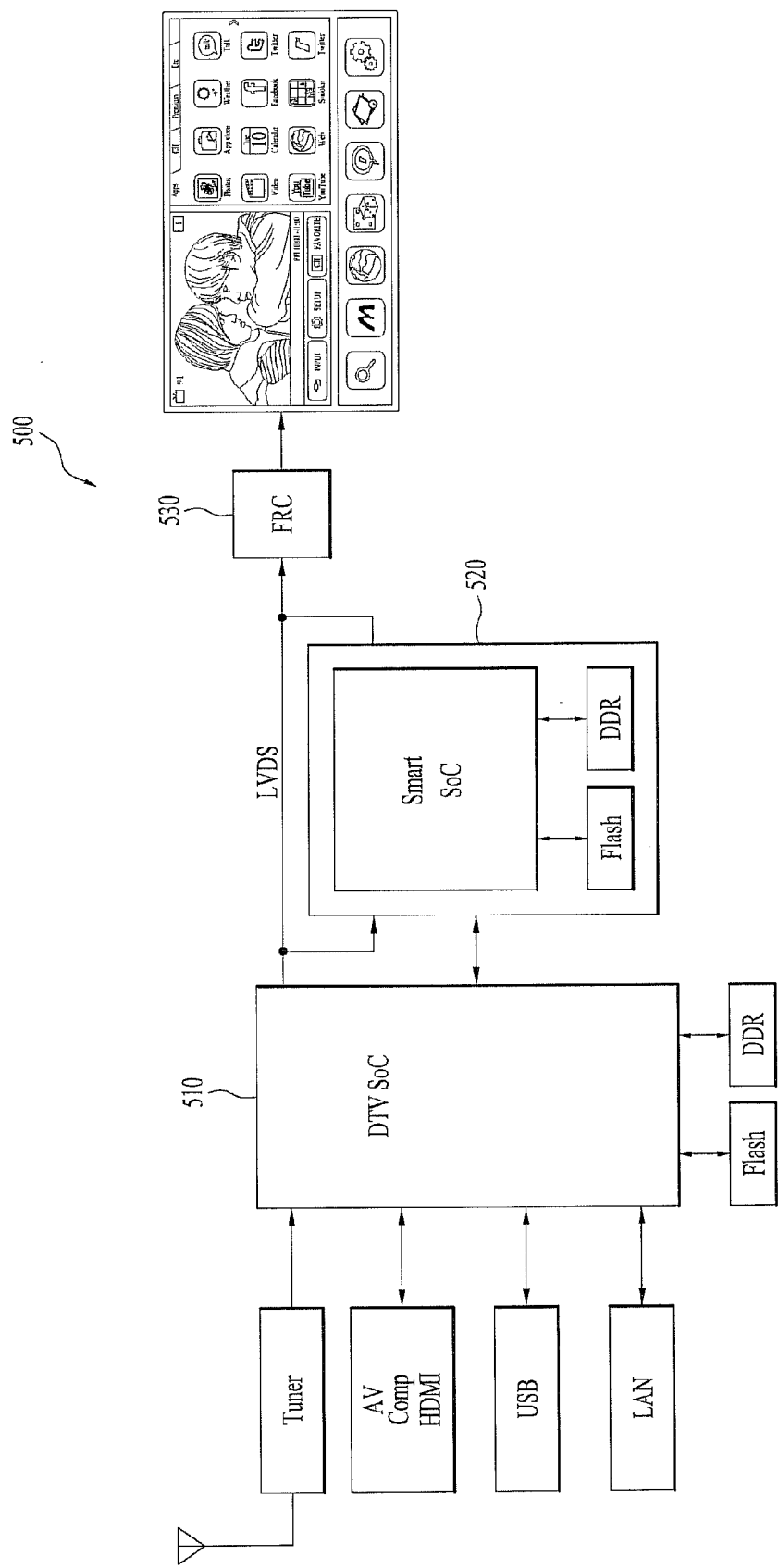
FIG. 5 is a block diagram of a display device equipped with an upgrade device according to another embodiment of the present disclosure.

FIG. 5 is a block diagram of a display device equipped with an upgrade device according to another embodiment of the present disclosure. A display device 500 includes a controller 510 implemented as a fundamental configuration in the form of an SoC and is connected to an upgrade device 520.

The controller 510 is configured in the form of an SoC and includes a central processing unit (CPU), a digital signal processor (DSP), and a micro control unit (MCU) and the upgrade device 520 is also configured in the form of an SoC. The upgrade device 520 can easily cope with upgrade functions or new standards since it is configured in the form of an SoC. Furthermore, it is possible to easily support modified user experience (UX) and user interface (UI) of the display device through extended memory capacity.

Upon connection of the upgrade device 520 to the display device, the master-slave protocol operates between the controller 510 and the upgrade device 520. Accordingly, the upgrade device 520 becomes a master and the controller 510 becomes a slave, and thus the controller 510 only supports the upgrade device 520 and the upgrade device 520 is assigned the authority to control the display device. In this case, since the upgrade device 520 can perform functions executed by the controller 510, the controller 510 may no longer execute the functions. The controller 510 may perform the broadcast reception function, LAN, and FRC.

Upon operation of the master-slave protocol, the upgrade device 520 and the controller 510 share SoC information thereof. The upgrade device 520 and the controller 510 can also share device mapper information and virtual device driver information. To transmit commands and large-capacity data between the two SoCs corresponding to the upgrade device 520 and the controller 510, a peripheral component interconnect (PCI) module may be connected between the upgrade device 520 and the controller 510. By using PCI, it is possible to support not only PCI cards but also an ISA extension card which is currently the most widely used extension card. More efficient transmission may be achieved by using PCIe2.08-lane or PCIe33.04-lane.

When the master-slave protocol operates, the external device interface 330 can receive upgrade data through a universal serial bus (USB) or a high definition multimedia interface (HDMI). For example, when a function that is not supported by the controller 510 needs to be upgraded, necessary data can be transmitted to the upgrade device 520 through a USB connection, and upgraded content can be delivered to the controller 510 through an HDMI connection and displayed.

When the master-slave protocol operates, the display unit 370 can directly receive graphic data from the upgrade device 520 and display the graphic data. Here, a low voltage differential signaling (LVDS) cable can be used. In this case, a cable configuration is simplified since a set-top terminal is directly connected to input/output terminals (composite, component, DVI, etc.), and a USB, Ethernet LAN, HDMI, or the like, can be supported as interfaces for communication with external devices.

It should be appreciated that, while the upgrade device has been described to have the control authority when the master-slave protocol operates, the assignment of the control authority is not limited to the above description.

The upgrade device may include an analog signal processor and a digital signal processor. The digital signal processor may be replaced by an upgraded digital signal processor. This will be described below in detail with reference to FIGS. 6, 7 and 8.

Figure 6:
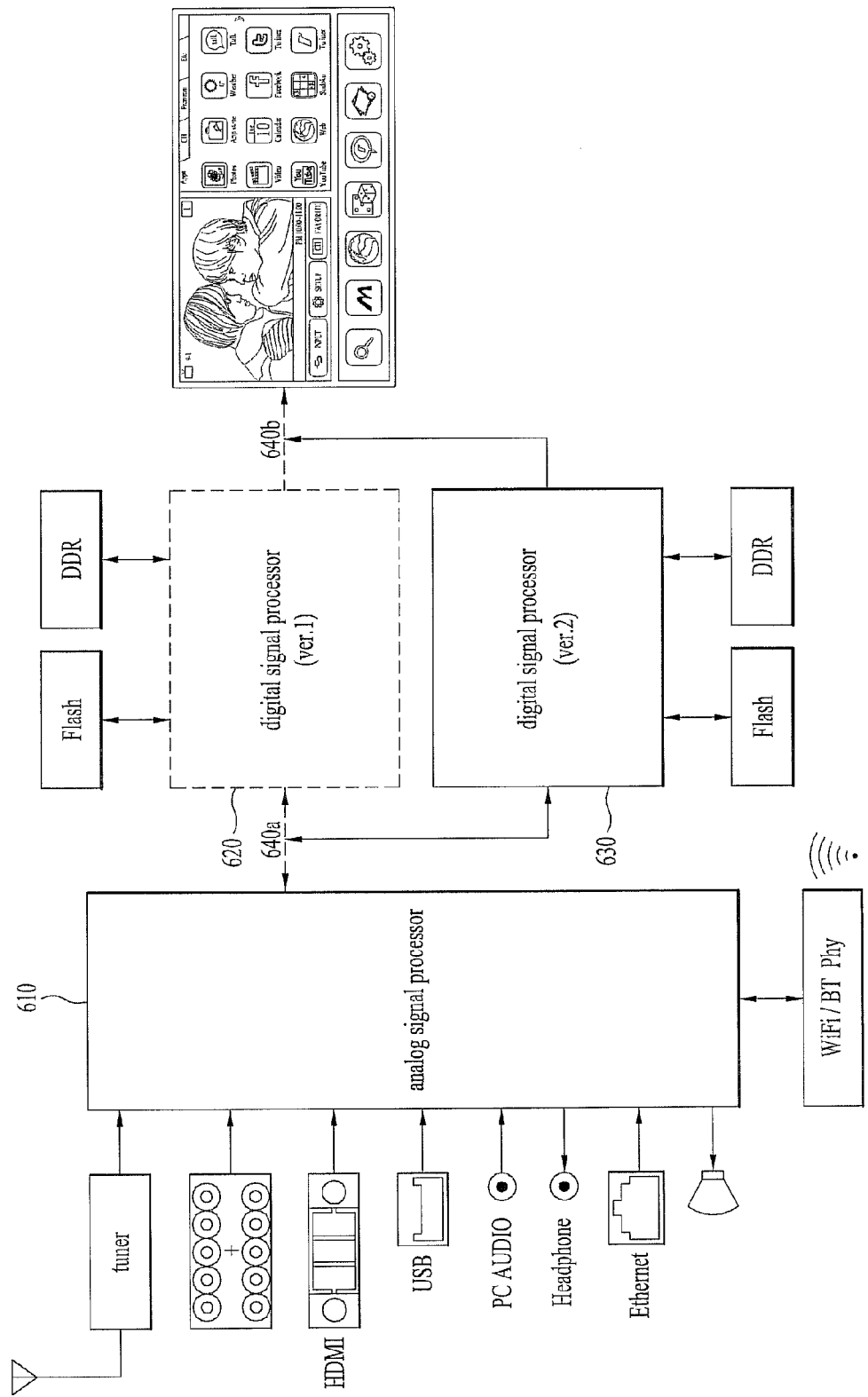
FIG. 6 is a block diagram of an upgrade device according to one embodiment of the present disclosure.

FIG. 6 is a block diagram of an upgrade device according to one embodiment of the present disclosure. The upgrade device according to one embodiment of the present disclosure includes an analog signal processor 610 and a digital signal processor 620.

The analog signal processor 610 may include an input/output (I/O) jack. Accordingly, an interface can be simplified while maintaining the existing jack layout and change of SoC line-up can be minimized. The digital signal processor 620 can be replaced by an updated digital signal processor 630. The digital signal processors 620 and 630 may include a video demodulator, a transcoder, a CPU, a GPU, a DVR engine, an audio DSP, etc., and may further include a memory.

The memory may store firmware necessary to control and manage hardware of the display device or the upgrade device and can be implemented as a storage medium such as a flash ROM, DDR, or the like. Firmware adapted to the display device is stored in the memory and shipped when the upgrade device is shipped, and the digital signal processor 630 having an updated version may be released with updated firmware.

In this case, it is possible to enable a modular SoC design by standardizing an interface 640a between the analog signal processor 610 and the digital signal processors 620 and 730 and an interface 640b between the digital signal processors 620 and 630 and a display panel, and embedding the standardized interfaces 740a and 740b in an SoC.

When the updated digital signal processor 630 is released or made available, the obsolete digital signal processor 620 may be replaced by the updated digital signal processor 630 and discarded. The embodiments of FIGS. 7 and 8 describe utilization of a dated digital signal processor.

Figure 7:
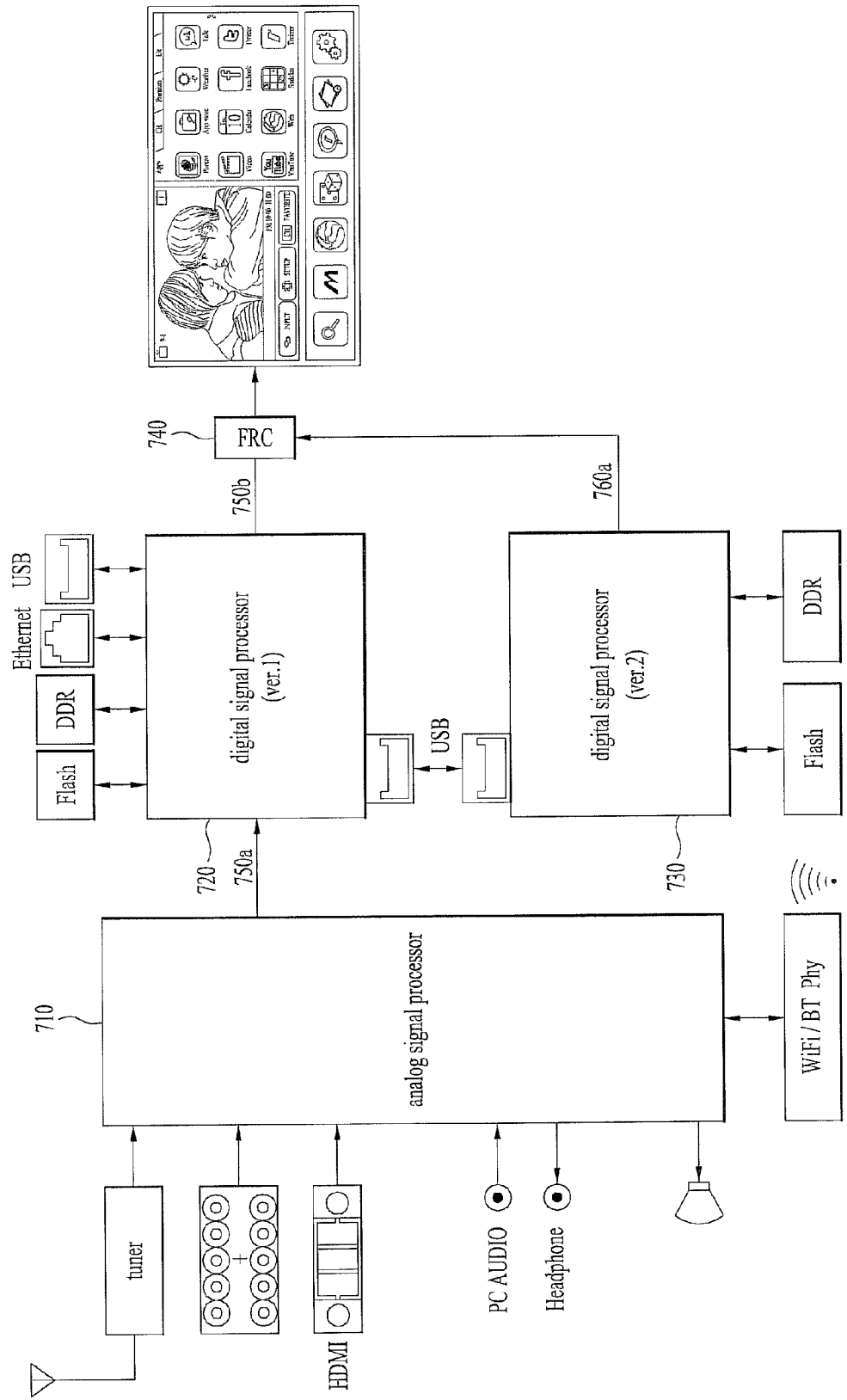
FIG. 7 is a block diagram of an upgrade device according to one embodiment of the present disclosure.

FIG. 7 is a block diagram of an upgrade device according to one embodiment of the present disclosure. The upgrade device may include an analog signal processor 710 and a digital signal processor 720.

The analog signal processor 710 may include an input/output (I/O) jack. Accordingly, an interface can be simplified while maintaining the existing jack layout and change of SoC line-up can be minimized. The digital signal processors 720 may include a video demodulator, a transcoder, a CPU, a GPU, a DVR engine, an audio DSP, etc., and may further include a separate memory, an Ethernet terminal, a USB terminal or the like. The digital signal processor 720 can be replaced by an updated digital signal processor 730. Distinguished from the first embodiment, the digital signal processor 720 may be partially used to optimize traffic to the updated digital signal processor 730 while being replaced by the updated digital signal processor 730.

Accordingly, an interface 750a between the analog signal processor 710 and the digital signal processor 720 and an interface 750b between the digital signal processor 720 and a display panel can be maintained. The obsolete digital signal processor 720 and the updated digital signal processor 730 may transmit/receive upgrade data through a USB port. The upgrade data can be directly transmitted to the display panel through a path 760a to be displayed as necessary.

In this case, it is possible to enable modular SoC design by standardizing the interface 750a between the analog signal processor 710 and the digital signal processors 720 and 730 and the interface 750b between the digital signal processors 720 and 730 and the display panel, and embedding the standardized interfaces 750a and 750b in an SoC.

Figure 8:
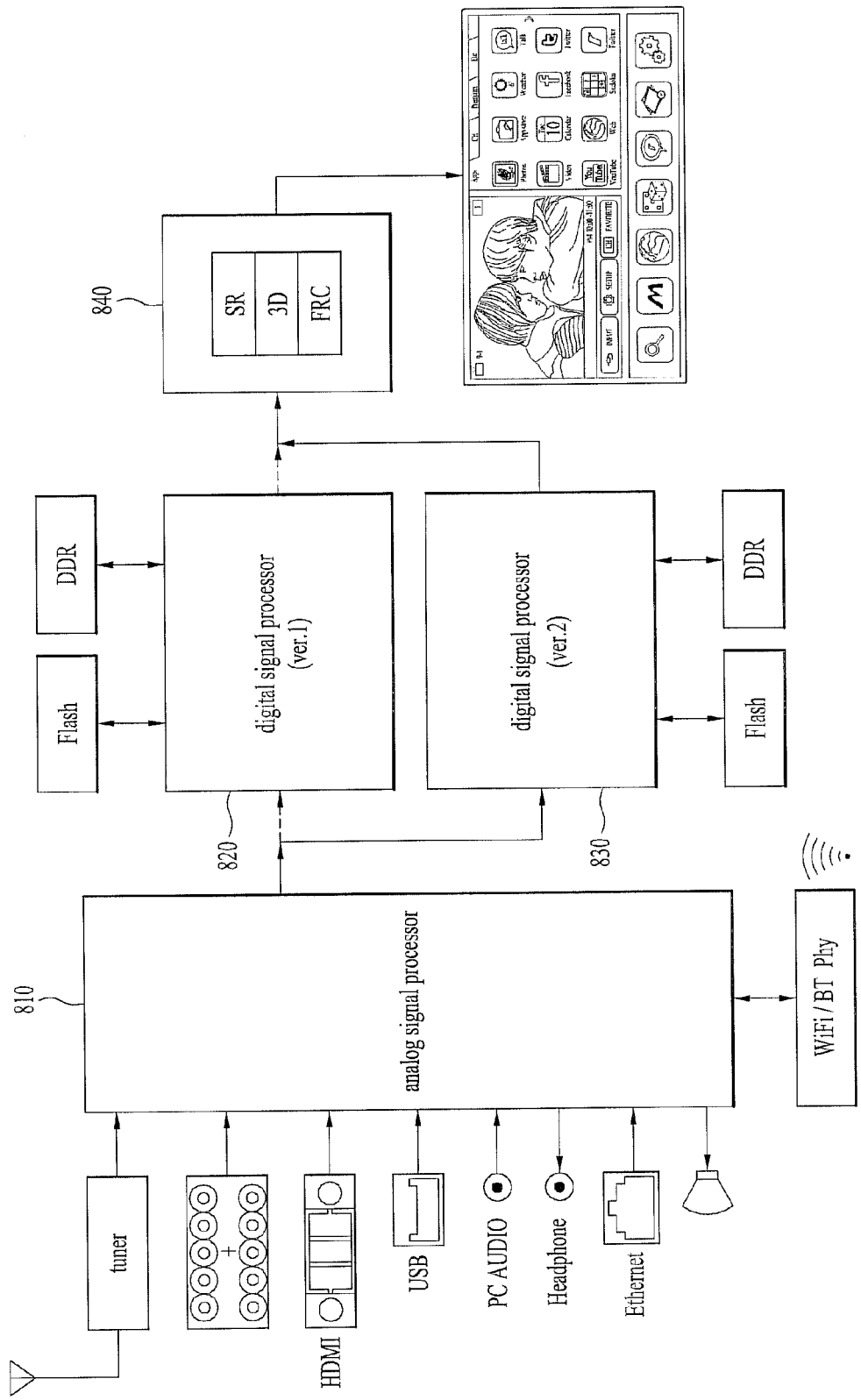
FIG. 8 is a block diagram of an upgrade device according to one embodiment of the present disclosure.

FIG. 8 is a block diagram of an upgrade device according to one embodiment of the present disclosure. The upgrade device includes an analog signal processor 810 and a digital signal processor 820.

The analog signal processor 810 may include an input/output (I/O) jack. Accordingly, an interface can be simplified while maintaining the existing jack layout and change of SoC line-up can be minimized. The digital signal processors 820 may include a video demodulator, a transcoder, a CPU, a GPU, a DVR engine, an audio DSP, etc., and may be replaced by an updated digital signal processor 830. The upgrade device of this embodiment can include a video processor 840 configured in the form of a chip, which processes graphics data prior to being displayed on a display panel. Accordingly, upgraded content can be displayed through the separate chip.

The video processor 840 can convert an output video signal such that the output video signal is adapted to a vertical frequency, resolution, aspect ratio, or the like, corresponding to the output standard of the display panel. That is, it is possible to adjust a frame rate or process data to be displayed, such as processing for 3D images, through the video processor 840. Accordingly, functions performed by the digital signal processors 820 and 830 can be reduced so as to achieve more efficient upgrade.

Figure 9:
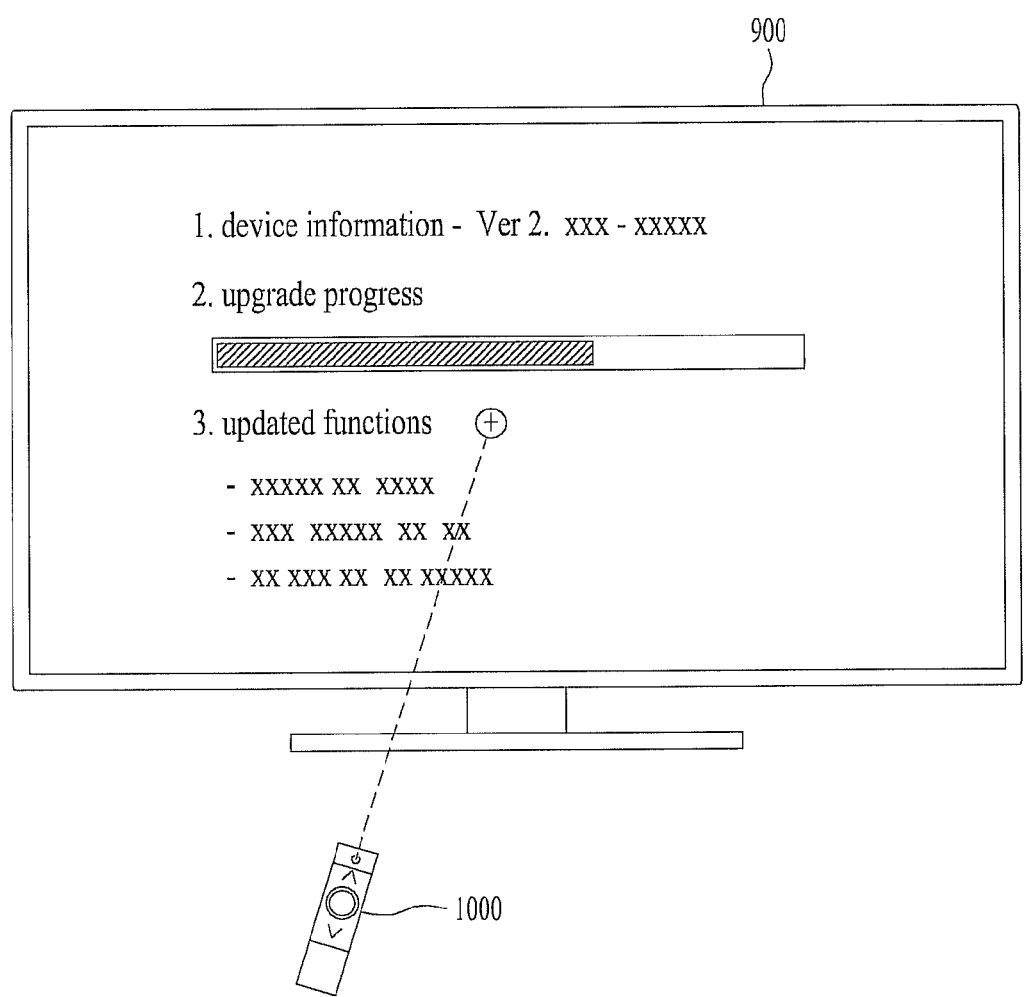
FIG. 9 is a diagram that illustrates a display of upgrade related information on a display device according to an embodiment of the present disclosure.

FIG. 9 is a diagram that illustrates a display of information regarding upgrade through a display device according to an embodiment of the present disclosure. A display panel of a display unit 900 can display at least one of upgrade device information, progress of an upgrade process, details of upgrade of the display device, upgradeable function information, upgraded function information, or another appropriate type of information. When this information regarding upgrade is provided to the user and upgraded functions are informed, the user can use the display device more efficiently.

Furthermore, when an item using a remote controller 1000 from items displayed on the display panel is selected, as illustrated in FIG. 9, the details regarding the selected item may be displayed. The remote controller 1100 can use Bluetooth, RF communication, IR communication, UWB, ZigBee, etc., which will now be described with reference to FIGS. 10 and 11.

Figure 10C:
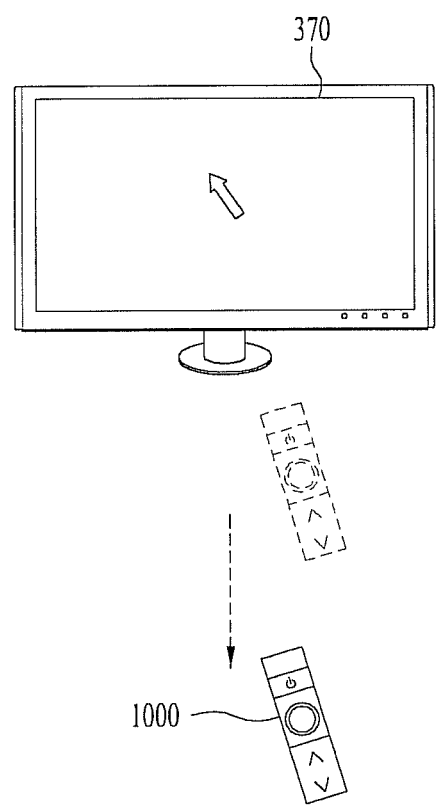

FIGS. 10A to 10C are diagrams that illustrate an operation of a remote controller for controlling a display device according to an embodiment of the present disclosure. As illustrated in FIG. 10A, a pointer 1001 corresponding to the remote controller 1000 may be displayed on the display 370 of the display device. The display 370 shown in FIG. 10 may correspond to the display of the display device of FIG. 3.

The remote controller 1000 may be moved up and down and to the left and right (FIG. 10B), the remote controller 1000 may be moved back and forth (FIG. 10C), or the remote controller 1000 may be rotated. The pointer 1001 displayed on the display unit 370 may indicate motion of the remote controller 1000. The remote controller 1000 can be referred to as a spatial remote controller since the pointer 1001 is moved along with motion of the remote controller 1000 in a 3D space.

FIG. 10B illustrates that the pointer 1001 displayed on the display 370 may move to the left when the user moves the remote controller 1000 to the left. Information about a motion of the remote controller 1000, sensed by a sensor of the remote controller 1000, may be transmitted to the display device 300. The display device 300 can compute coordinates of the pointer 1001 from the information about the motion of the remote controller 1000. The display device 300 can display the pointer 1001 at the computed coordinates.

FIG. 10C illustrates a case in which the remote controller 1000 is moved away from the display 370 while pressing a specific button of the remote controller 1000. In this case, a selected region on the display 370, which corresponds to the pointer 1001, may be zoomed in and magnified. Conversely, when the remote controller 1000 is moved closer to the display 370, the selected region on the display 370, which corresponds to the pointer 1001, may be zoomed out and reduced. Therefore, the smart function performed by the display device can be selected rapidly and conveniently by using the remote controller 1000, as illustrated in FIG. 10.

Figure 11:
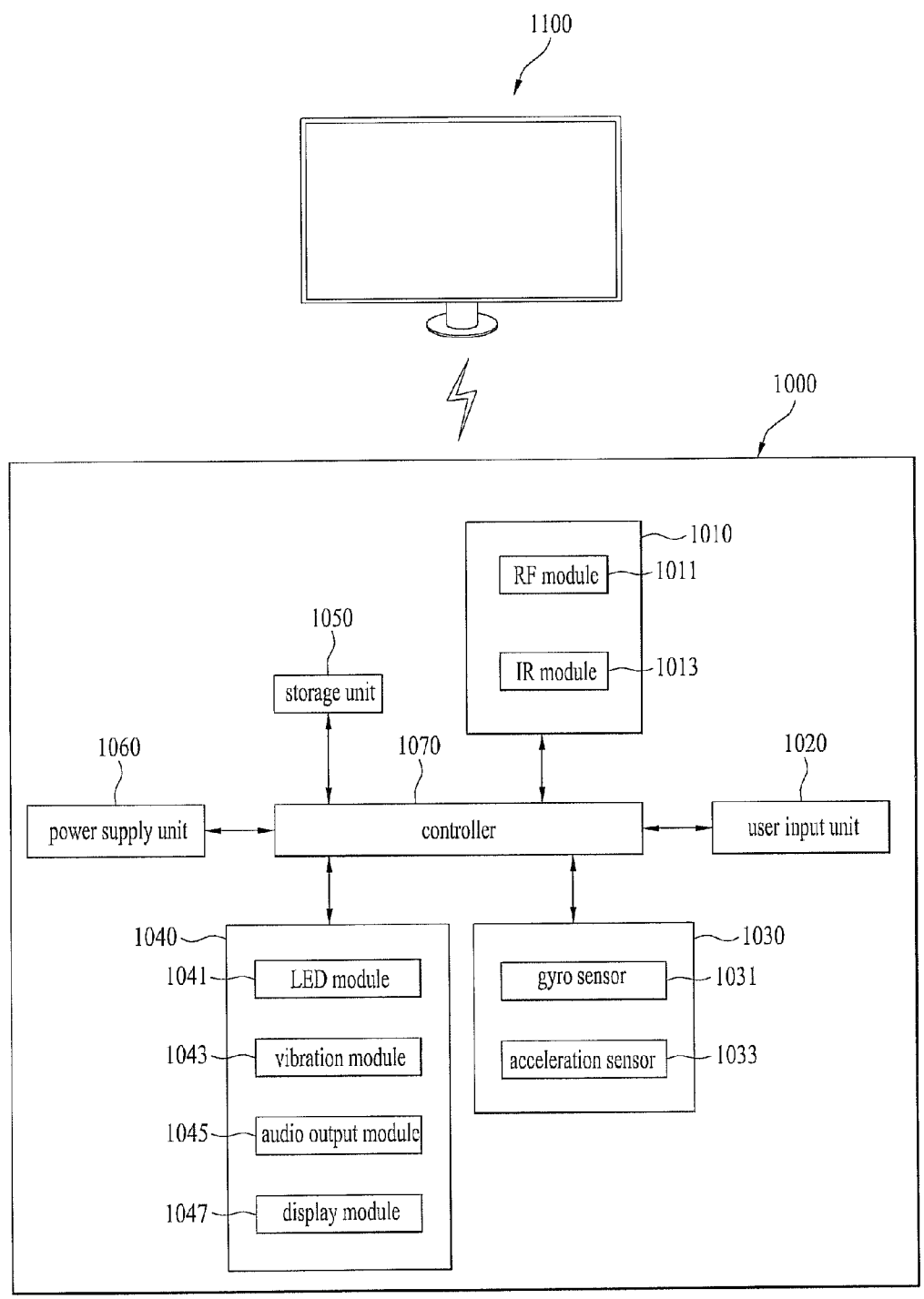
FIG. 11 is a block diagram of the remote controller of FIG. 10.

FIG. 11 is a block diagram of the remote controller of FIG. 10. The remote controller 1000 may include an RF communication unit 1010, a user input unit 1020, a sensor unit 1030, an output unit 1040, a storage unit 1050, a power supply unit 1060, and a controller 1070. The RF communication unit 1010 may transmit/receive signals to/from the above-mentioned display device.

The remote controller 1000 may include an RF module 1011 capable of transmitting/receiving signals to/from a display device 1100 according to an RF communication protocol. In addition, the remote controller 1000 may include an IR module 1013 capable of transmitting/receiving signals to/from the display device 1100 according to an IR communication protocol.

The remote controller 1000 may transmit a signal including information regarding motion of the remote controller 1000 to the display device 1100 through the RF module 1011. The remote controller 1000 can receive a signal transmitted from the display device 1100 through the RF module 1011. The remote controller 1000 can transmit a power on/off command, a channel change command, a volume change command, etc., to the display device 1100 through the IR module 1013 as necessary.

The user input unit 1020 can be configured as a keypad, buttons, a touch pad, a touchscreen, or another appropriate type of input interface. The user can input a command relating to the display device 1100 to the remote controller 1000 by operating the user input unit 1020. The sensor unit 1030 may include a gyro sensor 1031 or an acceleration sensor 1033.

For example, the gyro sensor 1031 can sense information about operation of the remote controller 1000 on the basis of x, y and z axes. The acceleration sensor 1033 can sense information about a moving speed of the remote controller 1000. The sensor unit 1030 may further include a distance measurement sensor to sense a distance between the remote controller 1000 and the display device 1100.

The output unit 1040 can output a video signal or an audio signal corresponding to an operation of the user input unit 1020 or a signal transmitted from the display device 1100. The user can recognize whether the user input unit 1020 is operated or whether the display device 1100 is controlled through the output unit 1040.

For example, the output unit 1040 can include an LED module 1041 which is turned on, a vibration module 1043 generating vibration, a sound output module 1045 outputting sound, or a display module 1047 displaying an image, when the user input unit 1020 is operated or a signal is transmitted/received between the output unit 1040 and the display device 1100.

The storage unit 1050 can store various programs necessary for control or operation of the remote controller 1000, application data, etc. If the remote controller 1000 transmits/receives an RF signal to/from the display device 1100 through the RF module 1011, the remote controller 1000 and the display device 1100 may transmit/receive the RF signal through a predetermined frequency band.

The power supply unit 1060 provides power to the remote controller 1000. The power supply unit 1060 can interrupt power supply when the remote controller 1000 is not moved for a predetermined time to reduce power waste. The power supply unit 1060 can resume power supply when a predetermined key of the remote controller 1000 is operated.

The controller 1070 may control the overall operation of the remote controller 1000. The controller 1070 can transmit a signal corresponding to a predetermined key operation of the user input unit 1020 or a signal corresponding to motion of the remote controller 1000, which is sensed by the sensor unit 1030, to the display device 1100 through the RF communication unit 1010.

Figure 12:
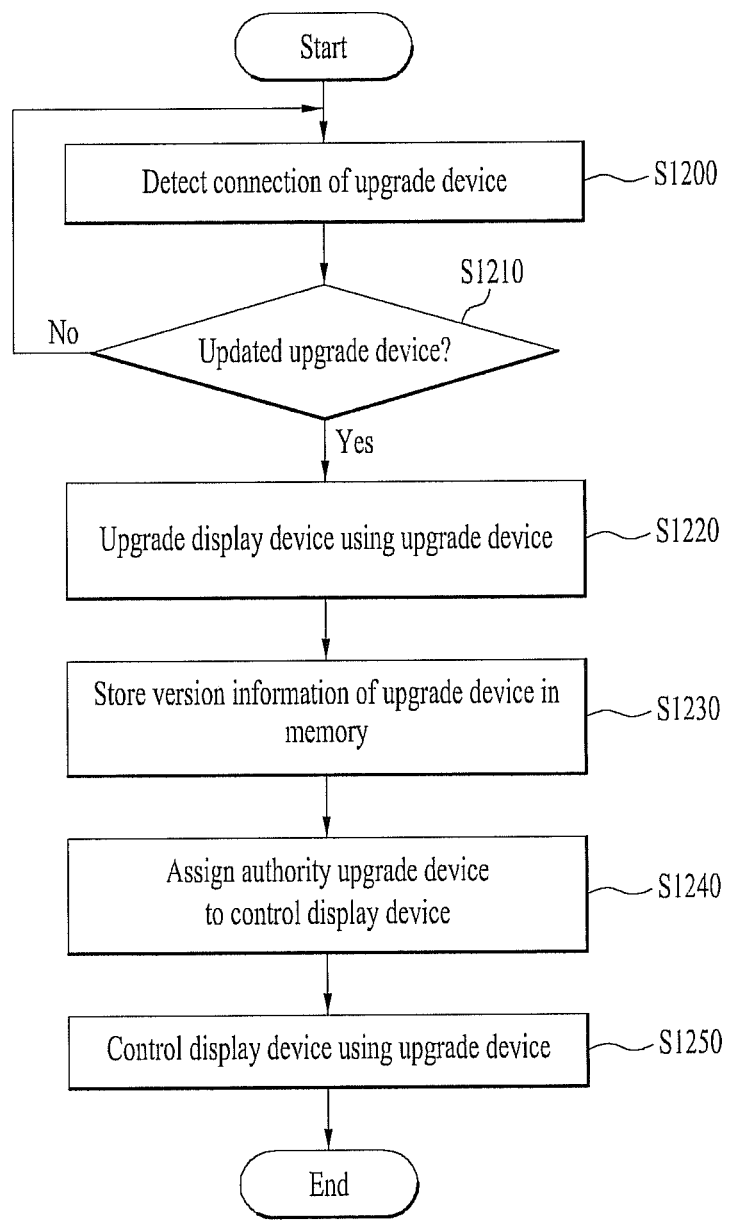
FIG. 12 is a flowchart of a method for controlling the upgradeable display device according to an embodiment of the present disclosure.

FIG. 12 is a flowchart of a method for controlling an upgradeable display device according to one embodiment of the present disclosure. A connection of an upgrade device is detected, in step S1200. A signal representing connection of the upgrade device to the display device may be received. This signal may be recognized by the external device interface when the upgrade device is connected to the display device and transmitted to the controller. Otherwise, the connection of the upgrade device can be automatically recognized by the controller according to plug & play.

Upon reception of the signal, it is determined whether the connected upgrade device is an updated upgrade device, in step S1210. If there is a previously connected upgrade device, it is possible to determine whether the newly connected upgrade device is an updated version by comparing the version information for the newly connected upgrade device with the version information of the previously connected upgrade device, which may be stored in the memory. Even when there is no previously connected upgrade device, it is possible to recognize whether the newly connected upgrade device has an updated version since a default upgrade device version may be stored in the memory.

When it is determined that the newly connected upgrade device has a new update, the display device is upgraded using the upgrade device, in step S1220. At least one of firmware, hardware or software of the display device can be upgraded using upgrade data received from the upgrade device. Specifically, the at least one of firmware, hardware or software of the display device can be upgraded using the upgrade data received from the upgrade device through a USB or an HDMI connection. Furthermore, the smart function that is rapidly developed can be upgraded such that the user can use the updated display device all the time.

Upon upgrade of the display device, the version information of the upgrade device may be stored in the memory, in step S1230. Here, it is possible to store information about the upgrade device and information about upgraded functions in the memory along with the version information of the upgrade device.

Once the upgrade of the display device has completed, authority to control the display device may be assigned to the upgrade device, in step S1240. The upgrade device is set as a master and the controller of the display device is set as a slave such that a master-slave relation is established between the upgrade device and the controller. In this case, the controller may perform only to support the upgrade device in controlling the general operations of the display device.

The upgrade device has high-end hardware and software relative to the display device because it is developed after the display device using the latest technology for upgrade.

Accordingly, it is possible to more efficiently control the display device by assigning the control authority to the upgrade device.

The display device may be controlled using the upgrade device, in step S1250. A signal for controlling the display device is received from the upgrade device assigned the control authority, and the display device is controlled according to the control signal.

The upgrade device can be embedded with hardware or software capable of upgrading the hardware and software of the display device. Accordingly, the upgrade device can include at least one of content for implementing a smart function in the display device, control data for controlling the display device or graphics data. Moreover, the upgrade device may be removably connected to the display device. The upgrade device can be implemented in the form of an SoC, a dongle, a smart card, or another appropriate type of device.

Figure 13:
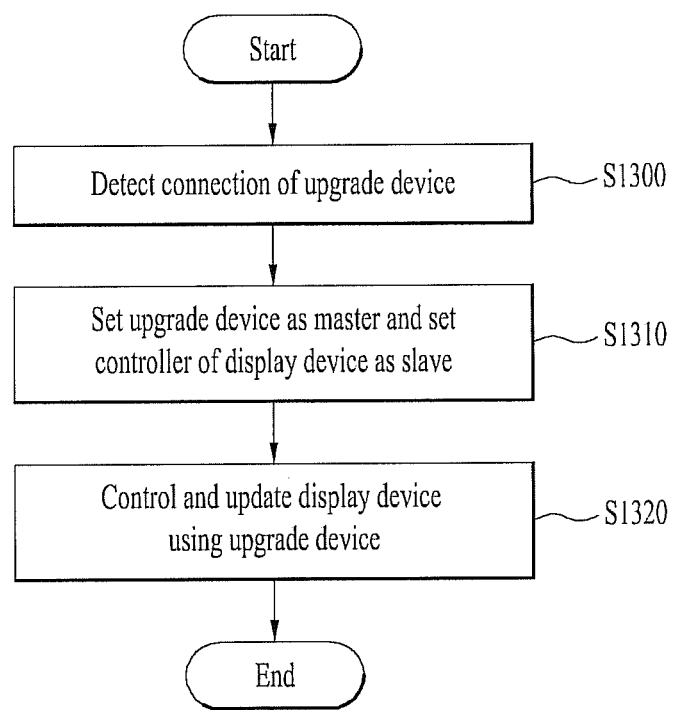
FIG. 13 is a flowchart of a method for controlling the upgradeable display device according to another embodiment of the present disclosure.

FIG. 13 is a flowchart illustrating a method for controlling an upgradeable display device according to another embodiment of the present disclosure. A connection of an upgrade device may be detected, in step S1300. A signal representing connection of the upgrade device to the display device may be received. Upon reception of the signal, it is determined whether the connected upgrade device has an updated version. If the connected upgrade device has an updated version, the upgrade device is set as a master and the controller of the display device is set as a slave to operate the master-slave protocol, in step S1310.

The master-slave protocol may define the particulars necessary to drive the display device, such as a method of transmitting data between the upgrade device and the controller of the display device, functions executed in the display device, etc., and may also define a communication protocol, transmission/reception data, etc. when the upgrade device is set to the master and the controller of the display device is set to the slave.

The upgrade device, as the master, upgrades the display device, and the display device is controlled by receiving a control signal from the upgrade device, in step S1320. For example, the upgrade device may control the display device to upgrade the display device and during the general operation of the display device to access the updated functions as well as other features of the display device.

As broadly disclosed and embodied herein, a method for controlling a display device may include detecting whether an upgrade device is connected to the display device; retrieving version information from the upgrade device; comparing the retrieved version information of the upgrade device with a previously stored version information stored in a memory; upgrading the display device using the upgrade device based on the comparison; and assigning authority to control the display device to the upgrade device.

The assigning authority to control the display device to the upgrade device may include setting the upgrade device as a master device and setting a controller of the display device as a slave device. The upgrading the display device may include upgrading at least one firmware, hardware or software of the display device using upgrade data received from the upgrade device. The upgrading the display device may include upgrading a smart function of the display device.

The upgrade device may include at least one hardware or software for upgrading a hardware or software of the display device. The upgrade device may include at least one content for implementing a smart function for the display device, control data for controlling the display device or graphics data. The upgrade device may be implemented in the form of an SoC (system-on-chip) or a dongle.

The method may further include storing the version information of the upgrade device connected to the display device in the memory. Moreover, the method may include receiving a request for a smart function at a user interface, and executing the smart function on the display device based on instructions received from the upgrade device.

In one embodiment, an upgradeable display device may include a broadcast receiver for receiving a broadcast signal; a demultiplexer for demultiplexing the received broadcast signal; a decoder for decoding the demultiplexed broadcast signal; a display for displaying the decoded broadcast signal; an external device interface for receiving upgrade data from an upgrade device; a memory for storing the upgrade data and version information of the upgrade device; and a controller configured to process and display the received broadcast signal on the display, determine whether the upgrade device is connected to the display device, determine whether a version of the upgrade device is an updated version, and assign authority to control the display device to the upgrade device.

The controller may be configured to function as a slave device to the upgrade device when the control authority is assigned to the upgrade device. The external device interface may receive a signal for controlling the display device from the upgrade device. The display may receive graphics data from the upgrade device when the control authority is assigned to the upgrade device.

The upgrade device may include at least one hardware or software for upgrading a hardware or software of the display device. The upgrade device may include at least one of content for implementing a smart function for the display device, control data for controlling the display device or graphics data. The upgrade device may be implemented in the form of an SoC or a dongle. The external device interface receives the upgrade data through a USB or an HDMI connection. Moreover, the display may display at least one information about the upgrade device, an upgrade progress, an upgrade history of the display device or information about upgradeable functions. The display device as disclosed herein may be a Smart TV.

In one embodiment, a method for controlling an upgradeable display device may include receiving a signal representing connection of an upgrade device to the upgradeable display device; comparing version information of the connected upgrade device with version information of a previous upgrade device, stored in a memory; upgrading the display device using the upgrade device when the connected upgrade device has been updated; assigning authority to control the display device to the upgrade device; and receiving a signal for controlling the display device from the upgrade device assigned the control authority.

In one embodiment, a upgradeable display device may include a broadcast receiver for receiving a broadcast signal; a demultiplexer for demultiplexing the received broadcast signal; a decoder for decoding the demultiplexed broadcast signal; a display unit for displaying the decoded broadcast signal; an external device interface for receiving upgrade data from an upgrade device; a memory for storing the upgrade data and version information of the upgrade device; and a controller for controlling the received broadcast signal to be processed and displayed on the display unit, checking whether the upgrade device is connected to the display device and a version of the upgrade device, and assigning authority to control the display device to the upgrade device.

The method for controlling the display device according to the present disclosure can be embodied as computer readable code on a computer readable medium. The computer readable medium is any data storage device that stores data which can be read by a computer system. Examples of the computer readable medium include read-only memory (ROM), random-access memory (RAM), CD-ROM, magnetic tape, floppy disk, optical data storage devices, and so on. The computer readable medium can also be embodied in the form of carrier waves as signals communicated over the Internet. The computer readable medium can also be distributed over a network of coupled computer systems so that the computer readable code is stored and executed in a distributed fashion.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an upgradeable display device, comprising:
   detecting whether an upgrade device is connected to the upgradeable display device, wherein a controller of the upgradeable display device controls overall operations of the upgradeable display device as a master with upgradeable display device control authority until the upgrade device is connected;
   retrieving version information of the upgrade device from the upgrade device;
   comparing the retrieved version information of the upgrade device with a previously stored version information stored in a memory of the upgradeable display device;
   upgrading at least one of firmware, hardware, or software of the upgradeable display device using upgrade data of the upgrade device based on the comparison, if the upgrade device has an updated version with respect to the previously stored version information stored in the memory; and
   assigning authority to control the upgradeable display device to the upgrade device via a master-slave protocol, whereby control authority is assigned to the upgrade device after connection of the upgrade device so that the upgrade device becomes a master and the controller of the display device becomes a slave to support the upgrade device to control operations of the upgradeable display device.

2. The method according to claim 1, wherein the upgradeable display device is one of a network Television TV, a smart TV, a hybrid broadcast television (HBTV), an internet TV, a web TV, Internet protocol television, or a digital TV receiver.

3. The method according to claim 1, wherein the upgrade data includes at least one of:
   an upgrade program for improving firmware or hardware of the display device.

4. The method according to claim 3, wherein the upgrade data is received from the upgrade device through a universal serial bus (USB) or a high definition multimedia interface (HDMI) connection.

5. The method according to claim 3, wherein the upgrading the upgradeable display device includes upgrading a smart function of the upgradeable display device, wherein the smart function is at least one of a function of using wired/wireless Internet, a function to enable connection to a computer, or a function of using an application installed in the upgradeable display device.

6. The method according to claim 1, wherein the upgrade device further includes hardware for upgrading a hardware of the upgradeable display device.

7. The method according to claim 6, wherein the upgrade device includes at least one content for implementing a smart function for the upgradeable display device, control data for controlling the upgradeable display device, or graphics data, wherein the smart function is at least one of a function using wired/wireless Internet, a function to enable connection to a computer, or a function of using an application installed in the display device.

8. The method according to claim 1, wherein the upgrade device is one of a card, a system-on-chip (SoC), or a dongle.

9. The method according to claim 1, further comprising storing the version information of the upgrade device connected to the upgradeable display device in the memory of the upgradeable display device.

10. The method of claim 1, further comprising receiving a request for a smart function at a user interface, and executing the smart function on the upgradeable display device based on instructions received from the upgrade device, wherein the smart function is at least one of a function of using wired/wireless Internet, a function to enable connection to a computer, or a function of using an application installed in the upgradeable display device.

11. An upgradeable display device comprising:
    a broadcast receiver for receiving a broadcast signal;
    a demultiplexer for demultiplexing the received broadcast signal;
    a decoder for decoding the demultiplexed broadcast signal;
    a display for displaying the decoded broadcast signal;
    an external device interface for receiving upgrade data from an upgrade device, wherein the upgrade device includes at least one of hardware or software for upgrading a hardware or software of the upgradeable display device;
    a memory for storing the upgrade data and version information of the upgrade device; and
    a controller configured to:
       control overall operation of the upgradeable display device as a master with upgradeable display device control authority until the upgrade device is connected;
       process and display the received broadcast signal on the display;
       determine whether the upgrade device is connected to the display device;
       retrieve version information of the upgrade device from the upgrade device; and
       determine that a version of the upgrade device is an updated version by comparing the retrieved version information of the upgrade device with a previously stored version information stored in the memory of the upgradeable display device, wherein the controller is further configured to:
  upgrade at least one of firmware, hardware, or software of the upgradeable display device using upgrade data of the upgrade device, wherein the upgrade data includes at least one of an upgrade program for improving firmware or hardware of the upgradeable display device or information about and control data for controlling additional hardware supported by the upgrade device; and
  assign authority to control the upgradeable display device to the upgrade device via a master-slave protocol, whereby control authority is assigned to the upgrade device after connection of the upgrade device so that the upgrade device becomes a master and the controller of the display device is configured to function as a slave device to the upgrade device to support the upgrade device to control operations of the upgradeable display device, wherein the display receives graphics data from the upgrade device.

12. The upgradeable display device of claim 11, wherein the upgrade device includes at least one of content for implementing a smart function for the upgradeable display device, control data for controlling the upgradeable display device, or graphics data, wherein the smart function is at least one of a function of using wired/wireless Internet, a function to enable connection to a computer, or a function of using an application installed in the upgradeable display device.

13. The upgradeable display device of claim 11, wherein upgrade device is at least one of a card, a system-on-chip (SoC), or a dongle.

14. The upgradeable display device of claim 11, wherein the display displays at least one of information about the upgrade device, an upgrade progress, an upgrade history of the display device, or information about upgradeable functions.

* * * * *